United States Patent
Chatterjee

(10) Patent No.: US 10,210,532 B2
(45) Date of Patent: Feb. 19, 2019

(54) BUSINESS-TO-BUSINESS INTERNET INFRASTRUCTURE

(75) Inventor: Pallab K. Chatterjee, Plano, TX (US)

(73) Assignee: JDA Software Group, Inc., Scottsdale, AZ (US)

( * ) Notice: Subject to any disclaimer, the term of this patent is extended or adjusted under 35 U.S.C. 154(b) by 1248 days.

(21) Appl. No.: 12/102,247

(22) Filed: Apr. 14, 2008

(65) Prior Publication Data

US 2008/0256258 A1    Oct. 16, 2008

Related U.S. Application Data

(60) Provisional application No. 60/911,942, filed on Apr. 16, 2007.

(51) Int. Cl.
G06Q 30/02    (2012.01)

(52) U.S. Cl.
CPC .................... *G06Q 30/02* (2013.01)

(58) Field of Classification Search
USPC ...................... 705/1, 14, 300–500
See application file for complete search history.

(56) References Cited

U.S. PATENT DOCUMENTS

| | | | | |
|---|---|---|---|---|
| 6,766,361 B1* | 7/2004 | Venigalla | ............... | G06Q 30/06 705/80 |
| 7,392,512 B2* | 6/2008 | Zhu | .............................. | 717/144 |
| 7,707,561 B2* | 4/2010 | Vera | ............................. | 717/136 |
| 7,761,484 B2* | 7/2010 | Christensen et al. | ........ | 707/807 |
| 2002/0173981 A1* | 11/2002 | Stewart | ........................... | 705/1 |
| 2004/0205613 A1* | 10/2004 | Li | .................... | G06F 17/30896 398/82 |
| 2005/0114394 A1* | 5/2005 | Kaipa et al. | ............... | 707/104.1 |
| 2006/0168511 A1* | 7/2006 | Bauer et al. | .................. | 715/513 |
| 2006/0200751 A1* | 9/2006 | Underwood et al. | ...... | 715/501.1 |
| 2006/0235973 A1* | 10/2006 | McBride | ................. | H04L 67/20 709/226 |
| 2006/0271570 A1* | 11/2006 | Bearden et al. | ............. | 707/100 |

FOREIGN PATENT DOCUMENTS

| | | |
|---|---|---|
| CN | 1848766 | 10/2006 |
| TW | I241503 | 10/2005 |

OTHER PUBLICATIONS

XML Web Host (www.xmlwebhost.com).*
Search Report for Taiwan Invention Patent Application No. 097113844; dated Oct. 28, 2014; p. 1.

* cited by examiner

*Primary Examiner* — Andrew B Whitaker
(74) *Attorney, Agent, or Firm* — Spencer Fane LLP; Steven J. Laureanti

(57) ABSTRACT

A system and method is disclosed for integrating a trading partner into an XML based Internet. The system is operable to access the Internet to register a business name with one or more XML naming systems and register a business name with one or more XML naming systems. The system is further operable to receive an XML based address from the one or more XML naming systems. The system is still further operable to assign the XML based address to an authoritative XML naming system and map the XML based address to the Internet.

33 Claims, 2 Drawing Sheets

BUSINESS-TO-BUSINESS INTERNET INFRASTRUCTURE

CROSS-REFERENCE TO RELATED APPLICATIONS

The present invention is related to that disclosed in U.S. Provisional Patent Application Ser. No. 60/911,942, filed 16 Apr. 2007, entitled "BUSINESS-TO-BUSINESS INTERNET INFRASTRUCTURE". U.S. Provisional Patent Application Ser. No. 60/911,942 is assigned to the assignee of the present application. The subject matter disclosed in U.S. Provisional Patent Application Ser. No. 60/911,942 is hereby incorporated by reference into the present disclosure as if fully set forth herein. The present invention hereby claims priority under 35 U.S.C. § 119(e) to U.S. Provisional Patent Application Ser. No. 60/911,942.

TECHNICAL FIELD OF THE INVENTION

This invention relates generally to communications systems, and more particularly to a business-to-business internet infrastructure.

BACKGROUND OF THE INVENTION

As the commercial significance of the Internet increases, business-to-consumer ("B2C"), business-to-business ("B2B"), and other electronic trading networks have become increasingly more prevalent. Each electronic trading network typically involves a set of users or trading partners (such as, for example, individuals, organizations, businesses, or electronic marketplaces) that communicate among themselves in order to complete business transactions.

However, in a typical electronic trading network, business transactions are restricted to users or trading partners who are subscribed to that network. That is, the electronic trading network limits the availability of business transactions to only those users or trading partners who are subscribed to that network. Consequently, this limits the commercial success of a user or trading partner associated with an electronic trading network, by minimizing the presence and availability of the user or trading partner to a specified trading network. This inability to provide a user or trading partner with the ability to conduct business transactions on a larger scale like, for example, the Internet is undesirable.

SUMMARY OF THE INVENTION

A system for integrating a trading partner into an XML based Internet is disclosed. The system is operable to access the Internet to register a business name with one or more XML naming systems and register a business name with one or more XML naming systems. The system is further operable to receive an XML based address from the one or more XML naming systems. The system is further operable to assign the XML based address to an authoritative XML naming system and map the XML based address to the Internet.

A method for integrating a trading partner into an XML based Internet is also disclosed. The method provides for accessing the Internet to register a business name with one or more XML naming systems and registering a business name with one or more XML naming systems. The method further provides for receiving an XML based address from the one or more XML naming systems. The method further provides for assigning the XML based address to an authoritative XML naming system and map the XML based address to the Internet.

Software for ration integrating a trading partner into an XML based Internet is also disclosed. The software is operable to access the Internet to register a business name with one or more XML naming systems and register a business name with one or more XML naming systems. The software is further operable to receive an XML based address from the one or more XML naming systems. The software is further operable to assign the XML based address to an authoritative XML naming system and map the XML based address to the Internet.

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

DETAILED DESCRIPTION OF THE INVENTION

Reference will now be made to the following detailed description of the preferred and alternate embodiments. Those skilled in the art will recognize that the present invention provides many inventive concepts and novel features, that are merely illustrative, and are not to be construed as restrictive. Accordingly, the specific embodiments discussed herein are given by way of example and do not limit the scope of the present invention.

Figure 1:
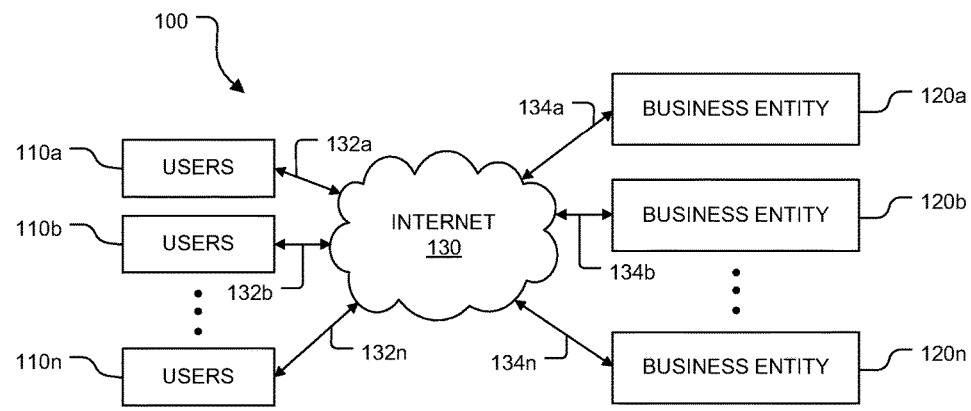
FIG. 1 illustrates an exemplary Business-to-Business network according to a preferred embodiment.

FIG. 1 illustrates an exemplary business-to-business (B2B) network 100 according to a preferred embodiment. B2B network 100 comprises one or more users 110a-110n, one or more business entities 120a-120n, Internet 130, and communication links 132a-132n and 134a-134n. Although one or more users 110a-110n and one or more business entities 120a-120n, are shown and described, embodiments contemplate any number of users 110a-110n and/or any number of business entities 120a-120n, according to particular needs. In addition, or as an alternative, one or more users 110a-110n may be integral to or separate from the hardware and/or software of any one of the one or more business entities 120a-120n.

In one embodiment, one or more users 110a-110n may include individuals, organizations, businesses, enterprises, customers, suppliers, or any other entity that communicates with and conducts business transactions with, one or more business entities 120a-120n, or with any other entity. In another embodiment, one or more business entities 120a-120n may include trading partners, such as individuals, organizations, businesses, enterprises, customers, suppliers, electronic marketplaces or any other entity that communicates with and/or conducts business transactions with, one or more users 110a-110n, one or more other business entities 120a-120n, or with any other entities.

In one embodiment, B2B network 100 may provide a network of business communities (i.e., one or more users 110a-110n and one or more business entities 120a-120n) using extensible markup language (XML) based routing. That is, B2B network 100, communicates using an XML connector and by routing various XML packets, rather than using traditional Internet Protocol (IP) based routing. In addition, or as an alternative, B2B network 100 may utilize the metadata about the various XML packets to facilitate the sharing of structured data and applications across Internet 130.

B2B network 100 may operate on one or more computers that may be integral to or separate from the hardware and/or software that support one or more users 110a-110n and one or more business entities 120a-120n. These one or more computers may include any suitable input device, such as a keypad, mouse, touch screen, microphone, or other device to input information. In addition, these one or more computers may include any suitable output device that may convey information associated with the operation of B2B network 100, including digital or analog data, visual information, or audio information. Furthermore, these one or more computers may include fixed or removable storage media, such as magnetic computer disks, CD-ROM, or other suitable media to receive output from and provide input to B2B network 100. In addition, these one or more computers may include one or more processors and associated memory to execute instructions and manipulate information according to the operation of B2B network 100.

In addition, or as an alternative, one or more users 110a-110n and/or one or more business entities 120a-120n may each operate on one or more separate computers or may operate on one or more shared computers. Each of these one or more computers may be a work station, personal computer (PC), network computer, personal digital assistant (PDA), wireless data port, or any other suitable computing device. In another embodiment, one or more users may be associated with one or more users 110a-110n and/or one or more business entities 120a-120n. These one or more users may include, for example, a "user" handling business transactions and/or one or more related tasks within B2B network 100. In addition, or as an alternative, these one or more users within B2B network 100 may include, for example, one or more computers programmed to autonomously handle business transactions and/or one or more related tasks within B2B network 100.

In one embodiment, one or more users 110a-110n may be coupled to Internet 130 using communications link 132a-132n, which may be any wireline, wireless, or other link suitable to support data communications between one or more users 110a-110n and Internet 130 during operation of B2B network 100. One or more business entities 120a-120n may be coupled to Internet 130 using communications links 134a-134n, which may be any wireline, wireless, or other link suitable to support data communications between one or more business entities 120a-120n and Internet 130 during operation of B2B network 100. Although communication links 132a-132n and 134a-134n are shown as generally coupling one or more users 110a-110n and one or more business entities 120a-120n to Internet 130, one or more users 110a-110n and one or more business entities 120a-120n may communicate directly with each other, according to particular needs.

In another embodiment, Internet 130 may include any appropriate local area networks (LANs), metropolitan area networks (MANS), or wide area networks (WANs) coupling one or more users 110a-110n and one or more business entities 120a-120n. For example, data may be maintained by one or more users 110a-110n at one or more locations external to one or more users 110a-110n and one or more business entities 120a-120n and made available to one or more associated users of one or more business entities 120a-120n using Internet 130 or in any other appropriate manner. Those skilled in the art will recognize that the complete structure and operation of communication Internet 130 and other components within B2B network 100 are not depicted or described. Embodiments may be employed in conjunction with known communications networks and other components.

Figure 2:
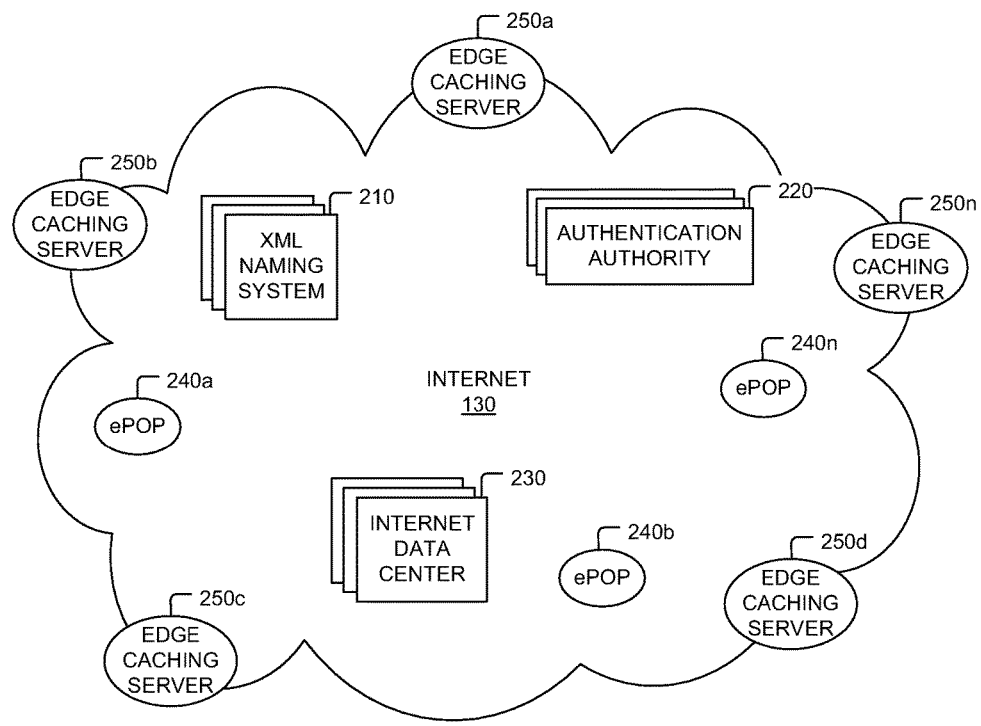
FIG. 2 illustrates the Internet of FIG. 1 in greater detail in accordance with the preferred embodiment.

FIG. 2 illustrates Internet 130 of FIG. 1 in greater detail in accordance with the preferred embodiment. Internet 130 comprises one or more XML naming systems 210, one or more authentication authorities 220, one or more Internet data centers 230, one or more electronic point of presence (ePOP's) 240a-240n, and one or more edge caching servers 250a-250n. Although one or more XML naming systems 210, one or more authentication authorities 220, one or more Internet data centers 230, one or more ePOP's 240a-240n, and one or more edge caching servers 250a-250n, are shown and described, embodiments contemplate any number of XML naming systems 210, any number of authentication authorities 220, any number of Internet data centers 230, any number of ePOP's 240a-240n, and/or any number of edge caching servers 250a-250n, according to particular needs.

In addition, or as an alternative, one or more XML naming system 210, one or more authentication authorities 220, one or more Internet data centers 230, one or more ePOP's 240a-240n, and one or more edge caching servers 250a-250n, of Internet 130 are shown and described as providing particular functionality and processing capabilities. The particular number and arrangement of one or more XML naming system 210, one or more authentication authorities 220, one or more Internet data centers 230, one or more ePOP's 240a-240n, and one or more edge caching servers 250a-250n are for illustrative purposes only. Other arrangements, configurations, relationships, or processing may be incorporated without departing from the scope of the present invention. Each of the one or more XML naming system 210, one or more authentication authorities 220, one or more Internet data centers 230, one or more ePOP's 240a-240n, and one or more edge caching servers 250a-250n may be separate from one another, or may be integrated with one another, according to particular needs.

As discussed above, one or more computers associated with one or more users 110a-110n and/or one or more business entities 120a-120n may include input devices, output devices, mass storage media, processors, memory, or other components for receiving, processing, storing, and communicating information according to the operation of B2B network 100. In addition, or as an alternative, one or more XML naming systems 210, one or more authentication authorities 220, one or more Internet data centers 230, one or more ePOP's 240a-240n, and one or more edge caching servers 250a-250n may also each operate on one or more separate computers or may operate on one or more shared computers. Each of these one or more computers may also include input devices, output devices, mass storage media, processors, memory, or other components for receiving, processing, storing, and communicating information according to the operation of B2B network 100.

In one embodiment, one or more XML naming systems 210 may comprise one or more servers and/or one or more databases, which may be local to or remote from XML naming system 210. In addition, or as an alternative, one or more XML naming systems 210 may provide for translating a business name (i.e., human-readable business names)

associated with one or more users 110a-110n and/or one or more business entities 120a-120n into an XML based address, wherein the XML based address may be independent of the physical routing hierarchy represented by the XML based address. In another embodiment, one or more XML naming systems 210 may distribute the responsibility for assigning XML based addresses and for mapping the XML based addresses to B2B network 100 by allowing an authoritative XML naming system 210 for each XML based address to keep track any changes. As an example only, and not by way of limitation, each XML based address may be associated with one or more XML naming systems 210 that may publish information about that XML based address and the one or more XML naming systems 210 based on a hierarchical relationship.

In accordance with the principles of embodiments, one or more business entities 120a-120n may register its business name with one of the one or more XML naming systems 210 such that, one or more users 110a-110n and/or one or more other business entities 120a-120n may communicate with and/or conduct business transactions with, these one or more business entities 120a-120n. Among other things, these one or more business entities 120a-120n are not dependent on a dedicated exchange like in some prior art hub and spoke models that limit the availability of business transactions, to only those users or trading partners who are subscribed to the particular dedicated exchange.

In one embodiment, one or more authentication authorities 220 may provide security through, for example, certification, authentication, and tunneling protocols for Internet 130. For example, one or more authentication authorities 220 may provide an agency based system, in which certification is granted or denied based on various agency rules and/or criteria. In addition, or as an alternative, once the one or more authentication authorities 220 grant a certificate, the certificate may reside in an XML connector associated with one or more users 110a-110n and/or one or more business entities 120a-120n, as discussed in more detail below.

In another embodiment, authentication associated with one or more authentication authorities 220 may provide validation for one or more users 110a-110n and/or one or more business entities 120a-120n. For example, a trading partner, who is seeking to communicate with and/or conduct business transactions with one or more other users 110a-110n and/or one or more other business entities 120a-120n, may validate if the other trading partner is valid entity. In another embodiment, one or more tunneling protocols associated with authentication authorities 220 may provide security for a transport payload (i.e., one network protocol) associated with one or more users 110a-110n and/or one or more business entities 120a-120n, that may be encapsulated within a different delivery protocol. In addition, or as an alternative, these tunneling protocols may also carry a payload over an incompatible delivery network (i.e., Internet 130) or provide a secure path through an untrusted network (i.e., Internet 130). In addition, tunneling protocols may use data encryption to transport insecure payload protocols over Internet 130, thereby providing a secure transport of XML data associated with one or more users 110a-110n and/or one or more business entities 120a-120n over Internet 130.

In one embodiment, one or more internet data centers 230 may provide a remote computing center for running joint applications between trading partners (i.e., one or more users 110a-110n and/or one or more business entities 120a-120n). In addition, or as an alternative, one or more internet data centers 230 may operate on demand, that is, there may be a plurality of grid computing sectors within the one or more internet data centers 230, wherein each of the plurality of grid computing sectors may be at an "idle" capacity until a joint application is requested to run on these plurality of grid computing sectors. In addition, one or more internet data centers 230 may comprise a dynamic cluster management system for dynamic load balancing of the plurality of grid computing sectors.

In one embodiment, one or more ePOP's 240a-240n may provide a point of presence at various locations across Internet 130 for conducting business transactions and/or running joint applications between trading partners (i.e., one or more users 110a-110n and/or one or more business entities 120a-120n). In addition, or as an alternative, one or more ePOP's 240a-240n may comprise one or more Internet data centers 230 or any other server and/or database for conducting business transactions and/or running joint applications, according to particular needs. In addition, one or more users 110a-110n and/or one or more business entities 120a-120n may inform another trading partner, that a business transaction may be conducted and/or a joint application may be run at a particular one of these one or more ePOP's 240a-240n. In this manner, the trading partners (i.e., one or more users 110a-110n and/or one or more business entities 120a-120n) may transmit their particular data and/or applications to be run at the particular one of the one or more ePOP's 240a-240n. Accordingly, once the joint applications are run at one of the one or more ePOP's 240a-240n, acknowledgement may be sent back to each trading partner (i.e., one or more users 110a-110n and/or one or more business entities 120a-120n).

Embodiments may also provide for distributing content (i.e., data and applications) from a local server associated with one or more users 110a-110n and/or one or more business entities 120a-120n to one or more edge caching servers 250a-250n that may be closer to a particular trading partner, (i.e., nearer the "edge" or at the periphery of Internet 130). As an example only, and not by way of limitation, one or more users 110a-110n and/or one or more business entities 120a-120n may communicate with one or more XML naming systems 210 to resolve an XML based address, the one or more XML naming systems 210 may respond with the closest edge caching server 250a-250n, to the trading partner. Thereafter, the data and/or applications may then be dynamically cached on the closest edge caching server 250a-250n, unless it has already been cached from another trading partner's traffic.

In addition, or as an alternative, a local XML naming system resolver and a local XML cache may also reside within one or more client applications for resolving an XML based address. In addition, these one or more client applications may be, for example, web-browsers, mail-clients, and other Internet applications associated with one or more users 110a-110n and/or one or more business entities 120a-120n. To further explain the operation of the local XML naming system resolver residing within the one or more client applications, an example is now given. In the following example, one or more client applications associated with one or more users 110a-110n and/or one or more business entities 120a-120n may make a request for resolving an XML based address. The one or more client applications may make this request to one or more XML naming systems 210 that may be defined in the one or more client applications settings. Once the one or more client applications local XML naming system resolver knows where the trading partners server associated with the authoritative XML naming system 210 is, it may make a XML naming system request for the XML based address of the desired trading partner. Thereafter, the trading partner's authoritative XML naming system 210 may return the XML based address of several of one or more ePOPs 240a-240n.

Continuing with this example, the one or more client applications local XML naming system resolver may make a XML naming system request for the XML based address of the desired trading partner. The one or more ePOPs 240a-240n may make a determination of which is the best of the one or more ePOPs 240a-240n to service this request and may return the XML based address. The XML based address may be this particular one or the one or more ePOPs 240a-240n, another one of the one or more ePOPs 240a-240n, or any of the one or more ePOPs 240a-240n, according to particular needs. The one or more client applications local XML naming system resolver may then return the XML based address to the one or more client applications. The one or more client applications may make the XML request of the origin trading partner server. The trading partner server may respond with the requested object. Although, an exemplary process is described for resolving an XML based address, embodiments contemplate any suitable process or combination of processes, according to particular needs.

Figure 3:
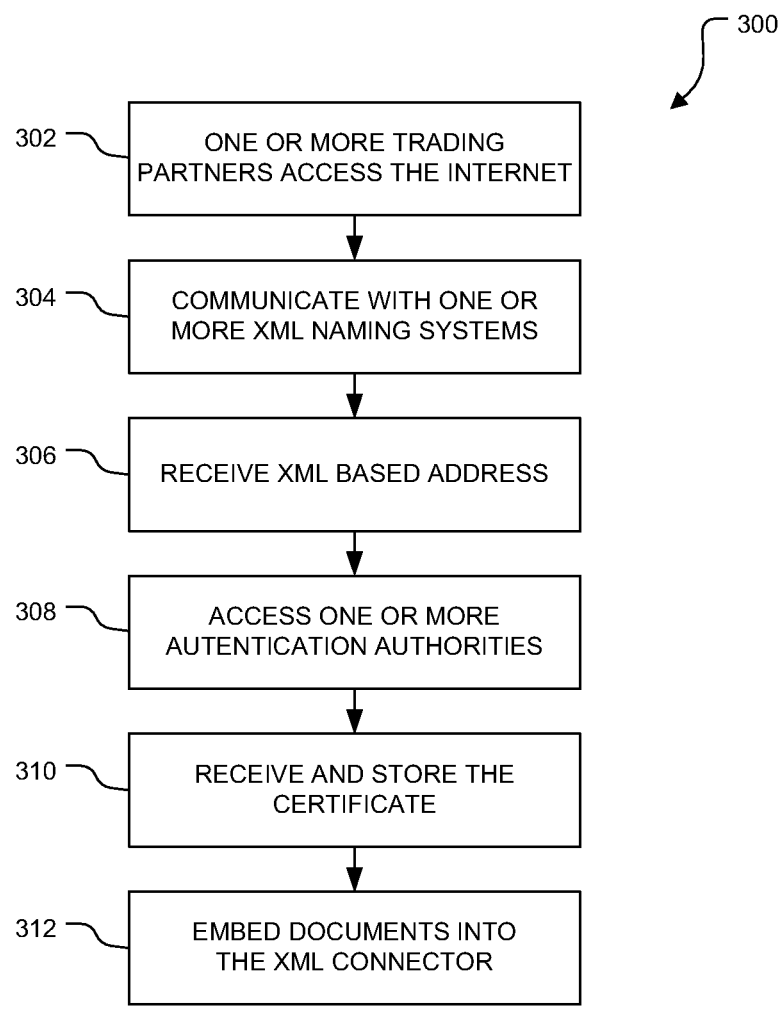
FIG. 3 illustrates an exemplary method for Business-to-Business integration across the Internet.

FIG. 3 illustrates an exemplary method 300 for B2B integration across Internet 130. The method begins at step 302, where a trading partner (i.e., one or more users 110a-110n and/or one or more business entities 120a-120n) may access Internet 130 via one or more communication links 134a-134n based on a viral adoption model. At step 304, the trading partner may communicate with one or more XML naming systems 210 to register a business name, into an XML based address. In addition, as discussed above, one or more XML naming systems 210 may distribute the responsibility for assigning XML based addresses and for mapping the XML based addresses to B2B network 100 by allowing an authoritative XML naming system 210 for each XML based address to keep track any changes.

At step 306, the trading partner may receive an XML based address, wherein, as discussed above, the XML based address may be independent of the physical routing hierarchy represented by the XML based address. At step 308, the trading partner may communicate with one or more authentication authorities 220 to provide security for traversing across Internet 130. In addition, as discussed above, one or more authentication authorities 220 may provide an agency based system, in which certification is granted or denied based on various agency rules and/or criteria. At step 310, the trading partner may receive the certificate, wherein the trading partner may store the certificate in an XML connector associated with the trading partner.

At step 312, the trading partner may embed documents into an XML document (i.e., XML packet), including the XML connector, using an electronic data exchange, such as for example, an electronic data interchange (EDI). Although, an example electronic data exchange is described, embodiments contemplate any electronic data exchange for transferring structured data by, for example, message standards between trading partners across Internet 130. In addition, or as an alternative, the XML document (i.e., XML packet) may comprise metadata. The XML document may comprise information about the embedded documents associated with the trading partner, including information about the information. In addition, the metadata may also comprise pointers that provide hyperlinks, and the like to additional information about particular data.

Reference in the foregoing specification to "one embodiment", "an embodiment", or "another embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A business-to-business infrastructure system, comprising:
  an electronic trading network comprising an extensible markup language (XML) network and one or more trading partners, the XML network comprises one or more XML naming computer systems, one or more authentication authorities and communicates using an XML connector based on routing one or more XML packets, the one or more trading partners comprising one or more computers comprising one or more processing units and one or more memory units, the one or more processing units programmed to:
    access the XML network to register a business name into an XML based address;
    register the business name into the XML based address with the one or more XML naming computer systems;
    receive the XML based address over the XML network from the one or more XML naming computer systems;
    communicate data across the XML network based, at least in part, on the XML based address; and
  at least one of the one or more authentication authorities provide security to traverse data across the XML network based, at least in part, on the XML based address.

2. The system of claim 1, wherein the one or more processing units is further programmed to:
  assign the XML based address to an authoritative XML naming computer system, the XML naming computer system maps the XML based address to the XML network to track changes to the XML based address.

3. The system of claim 1, wherein the one or more processing units is further programmed to publish information on the XML network about that XML based address and the XML naming computer systems, based on a hierarchical relationship.

4. The system of claim 1, wherein the XML based address is independent of a physical routing hierarchy represented by the XML based address.

5. The system of claim 1, wherein the security comprises a certificate based on agency criteria.

6. The system of claim 1, wherein the security comprises authentication of the one or more trading partners.

7. The system of claim 6, wherein the one or more processing units is further programmed to store the certificate in the XML connector associated with the one or more trading partners.

8. The system of claim 1, wherein the security comprises a tunneling protocol that encapsulates a transport payload within a delivery payload.

9. The system of claim 1, wherein the one or more processing units is further programmed to embed one or more documents into an XML document using an electronic data exchange, wherein the XML document comprises the XML connector and information about the embedded one or more documents associated with the one or more trading partners.

10. The system of claim 9, wherein the electronic data exchange is an electronic data interchange.

11. The system of claim 10, wherein the XML document comprises metadata and the metadata comprises pointers.

12. A business-to-business infrastructure method, comprising:
- accessing, by a computer, an extensible markup language (XML) network comprising one or more XML naming computer systems and one or more authentication authorities to register a business name into an XML based address, the XML network communicates using an XML connector based on routing one or more XML packets;
- registering, by the computer, the business name into the XML based address with the one or more XML naming computer systems;
- receiving, by the computer, the XML based address over the XML network from the one or more XML naming computer systems;
- communicating, by the computer, data across the XML network based, at least in part, on the XML based address; and
- providing, by at least one of the one or more authentication authorities, security to traverse data across the XML network based, at least in part, on the XML based address.

13. The method of claim 12, further comprising:
- assigning the XML based address to an authoritative XML naming computer system, the XML naming computer system mapping the XML based address to the XML network to track changes to the XML based address.

14. The method of claim 12, further comprising publishing information on the XML network about that XML based address and the XML naming computer systems, based on a hierarchical relationship.

15. The method of claim 12, wherein the XML based address is independent of a physical routing hierarchy represented by the XML based address.

16. The method of claim 12, wherein the security comprises a certificate based on agency criteria.

17. The method of claim 12, wherein the security comprises authentication of the one or more trading partners.

18. The method of claim 17, further comprising storing the certificate in the XML connector associated with the one or more trading partners.

19. The method of claim 12, wherein the security comprises a tunneling protocol that encapsulates a transport payload within a delivery payload.

20. The method of claim 12, further comprising embedding one or more documents into an XML document using an electronic data exchange, wherein the XML document comprises the XML connector and information about the embedded one or more documents associated with the one or more trading partners.

21. The method of claim 20, wherein the electronic data exchange is an electronic data interchange.

22. The method of claim 21, wherein the information about the embedded one or more documents comprises pointers.

23. A non-transitory computer-readable medium embodied with software, the software when executed using one or more computers is programmed to:
- access an extensible markup language (XML) network comprising one or more XML naming computer systems and one or more authentication authorities to register a business name into an XML based address, the XML network communicates using an XML connector based on routing one or more XML packets;
- register the business name into the XML based address with the one or more XML naming computer systems;
- receive the XML based address over the XML network from the one or more XML naming computer systems;
- communicate data across the XML network based, at least in part, on the XML based address; and
- provide security to traverse data across the XML network based, at least in part, on the XML based address.

24. The non-transitory computer-readable medium of claim 23, wherein the software is further programmed to:
- assign the XML based address to an authoritative XML naming computer system, the XML naming computer system maps the XML based address to the XML network to track changes to the XML based address.

25. The non-transitory computer-readable medium of claim 23, wherein the software is further programmed to publishing information on the XML network about that XML based address and the XML naming computer systems, based on a hierarchical relationship.

26. The non-transitory computer-readable medium of claim 23, wherein the XML based address is independent of a physical routing hierarchy represented by the XML based address.

27. The non-transitory computer-readable medium of claim 23, wherein the security comprises a certificate based on agency criteria.

28. The non-transitory computer-readable medium of claim 23, wherein the security comprises authentication of the one or more trading partners.

29. The non-transitory computer-readable medium of claim 28, wherein the software is further programmed to store the certificate in the XML connector associated with the one or more trading partners.

30. The non-transitory computer-readable medium of claim 23, wherein the security comprises a tunneling protocol that encapsulates a transport payload within a delivery payload.

31. The non-transitory computer-readable medium of claim 23, wherein the software is further programmed to embed one or more documents into an XML document using an electronic data exchange, wherein the XML document comprises the XML connector and information about the embedded one or more documents associated with the one or more trading partners.

32. The non-transitory computer-readable medium of claim 31, wherein the electronic data exchange is an electronic data interchange.

33. The non-transitory computer-readable medium of claim 32, wherein the information about the embedded one or more documents comprises pointers.

* * * * *